United States Patent [19]

Pitt

[11] 4,046,539

[45] Sept. 6, 1977

[54] METHOD AND APPARATUS FOR PRODUCING GLASS FIBERS

[75] Inventor: Richard E. Pitt, Newark, Ohio

[73] Assignee: Owens-Corning Fiberglas Corporation, Toledo, Ohio

[21] Appl. No.: 615,433

[22] Filed: Sept. 22, 1975

Related U.S. Application Data

[63] Continuation of Ser. No. 473,466, May 28, 1974, abandoned.

[51] Int. Cl.² ............................................. C03B 37/04
[52] U.S. Cl. ............................................. 65/6; 65/8; 65/14
[58] Field of Search .................... 65/8, 14, 15, 6, 12

[56] References Cited

U.S. PATENT DOCUMENTS

| 2,855,626 | 10/1958 | Firnhaber | 65/14 |
|---|---|---|---|
| 2,949,632 | 8/1960 | Kleist et al. | 65/14 |
| 3,149,944 | 9/1964 | Leaman | 65/14 X |
| 3,179,507 | 4/1965 | Leveque et al. | 65/14 X |
| 3,233,990 | 2/1966 | Stephens | 65/6 |
| 3,372,011 | 3/1968 | Porter | 65/14 |
| 3,393,986 | 7/1968 | Firnhaber | 65/15 |
| 3,622,293 | 11/1971 | Firnhaber | 65/14 |

Primary Examiner—Robert L. Lindsay, Jr.
Attorney, Agent, or Firm—John W. Overman; Ted C. Gillespie; Philip R. Cloutier

[57] ABSTRACT

The present invention relates to the art of manufacturing glass fibers by the rotary process. A flow controller is located immediately downstream of the rotor means, stabilizing the fiber veil flow parameters. Mass addition to the boundary layer along the flow controller profile is employed to maintain the flow controller temperature and reduce the occurrence of fibers striking the controller.

12 Claims, 4 Drawing Figures

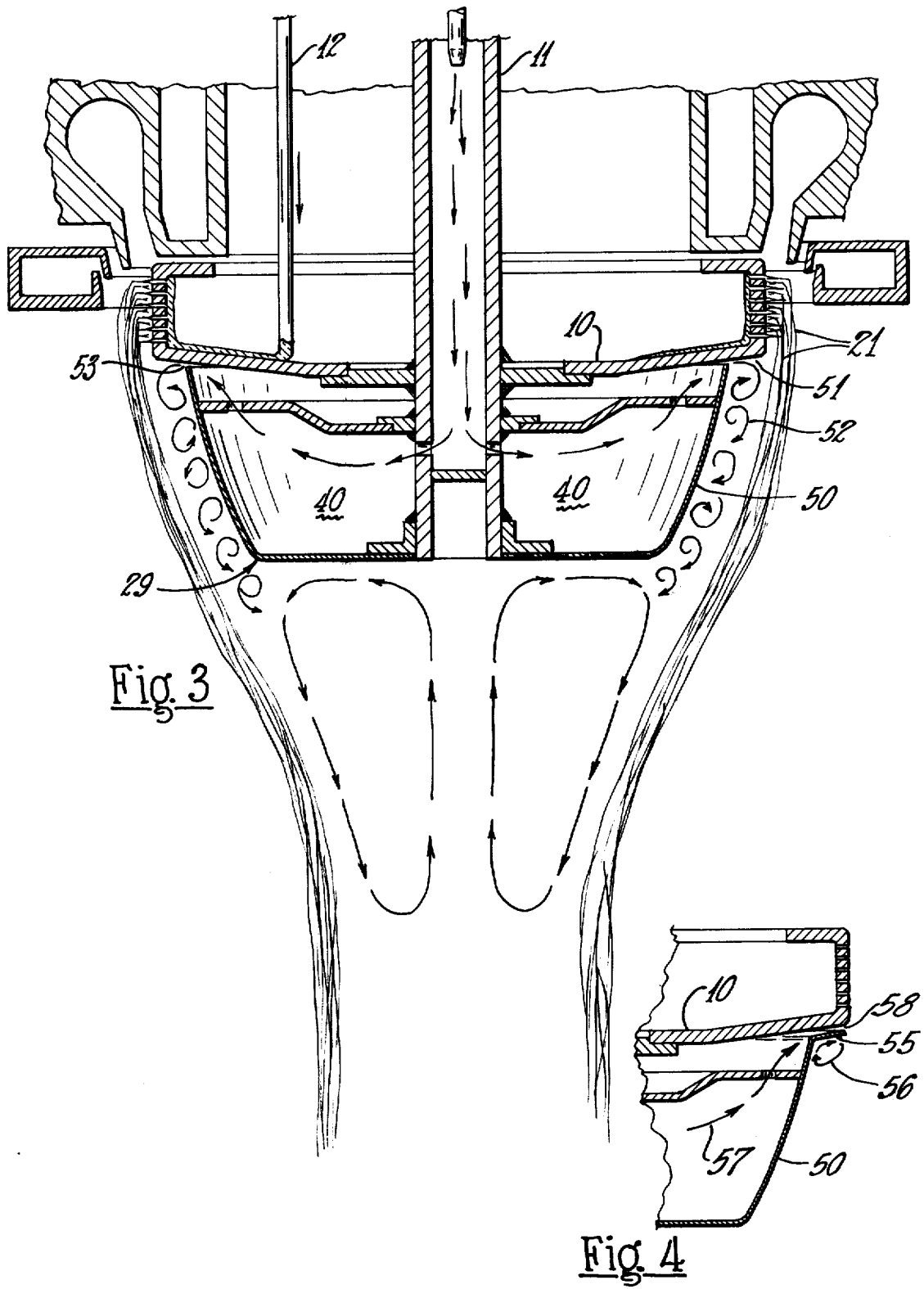

METHOD AND APPARATUS FOR PRODUCING GLASS FIBERS

This is a continuation, of application Ser. No. 473,466, filed May 28, 1974 now abandoned.

DESCRIPTION OF THE PRIOR ART

The present invention relates to an improved method and apparatus for the manufacture of fibers from molten glass or other thermoplastic materials, by the centrifuge or rotary forming method.

It is well known within the art to produce large quantities of glass fibers by supplying a stream of molten glass to a high speed centrifuge or rotor having a multiplicity of orifices about its peripheral face through which the molten glass flows by centrifugal force. The emanating streams of glass from the rotor orifices are subjected to a high velocity gaseous blast attenuating the molten streams into fine fibers or filaments. The production rate at which glass fibers may be produced by this process is a function of the number of orifices about the rotor periphery. Therefore, to increase the production rate more glass stream forming orifices must be provided; this may be accomplished by increasing the peripheral surface area of the rotor into which the orifices are drilled. Peripheral surface area is increased by increasing the depth of the rotor or increasing its diameter.

Increasing the rotor depth causes glass flow and thermal equilibrium problems resulting in undesirable glass fiber properties; on the other hand by increasing the rotor diameter, the fluid dynamics downstream of the rotor is adversely affected. The low pressure region directly downstream of the rotor becomes larger and has a greater influence on the stability of the fiber veil flowing from the rotor. Experience has shown that by increasing the rotor diameter to within the range of twelve to sixteen inches the fiber veil may become extremely unstable. The unstable veil tends to aimlessly wobble omnidirectionally about the downstream extension of the rotor's axis of rotation. This wobbling affects the flow parameters of the burner and the attenuating gaseous blast in the fiberizing zone. The area of greatest affect is believed to be diametrically opposite the direction of the wobble. Because of the disturbed flow parameters a coarse, non uniform and undesirable fiber is produced. If the veil is permitted to continuously wobble about there will always be a fiberizing zone from which the coarse fibers emanate thus resulting in a non uniform glass wool product.

The phenomenon of veil instability is not necessarily restricted to large diameter rotors. unstable veils have been observed downstream of rotors having eight inch diameters. Generally speaking, the instability phenomenon may be observed for various attenuating momentums depending upon the vortex strength immediately downstream of the rotor.

Advantages to be gained by increasing the rotor diameter are slower RPM for a given glass fiber production rate. For example, an eight, twelve, and fifteen inch rotor may turn approximately 3,000, 2,100 and 1,600 revolutions per minute respectively to produce 1,000, to 1,500 pounds of glass fibers per hour. Further, the centrifugal forces acting on the rotors at the above cited speeds are approximately 1,000 750, and 570 g's respectively. Therefore, larger diameter rotors operate with a lesser material strain and may be expected to have longer, useful lives.

Typical prior art techniques to diminish the affect of the low pressure region downstream of the rotor and hence control the fiber veil may be found in U.S. Pat. Nos. 3,114,618, 3,285,723, 3,179,507, 3,372,011, 2,855,626 and also 3,040,377. The first three patents cited employ means to physically force the fiber veil outward and away from the axial centerline downstream of the rotor. This is accomplished by placing within the veil, geometric structures such as conical surfaces diverging in the downstream direction or by the introduction of a gas such as air or stream into the low pressure region reducing its strength. Converging conic bodies of revolution are attached to the bottom of the rotor in the latter three references as means to reduce the flow instability downstream of the rotor.

The conic configuration, while simple to manufacture, is not the optimum shape for displacing the low pressure region. A separated flow condition exists with a characteristic eddy of reverse flow of gas and fibers in the upstream direction along the cone surface. Further experience has indicated that operational temperatures of the glass fibers, the attenuating medium and the conic body may be such tnat fibers impinging the conic surface stick thereto. Such a condition disrupts the fiber veil flow parameters.

DESCRIPTION OF MY INVENTION

The present invention stabilizes the veil flow parameters by placing a flow controller comprising a body of revolution whose configuration or profile approximates the nominal streamline defining the region of low pressure downstream of the rotor. A mass addition of air, or any other suitable gas is injected into the boundary layer and flows along the profile of the flow controller providing a relatively cool boundary layer along the surface of the controller. Further, the cool boundary layer controls the surface temperature of the controller by reducing the heat transfer across the boundary layer and further provides a dynamic barrier of high density gas shielding the flow controller from fiber impingement. Two basic types of flow controllers are within the scope of my invention, those having laminar and turbulent boundary layer flow.

Although it is not necessary within the scope of my invention, it is preferable to enclose the flow controller and utilize its internal volumetric capacity as an accumulator thereby damping out any fluctuations of the supply gas pressure and providing a smooth continuous flow of gas into the boundary layer.

It is therefore an object of my invention to provide an improved method and apparatus for stabilizing the flow parameters of the fiber veil immediately downstream from a centrifugal fiberizing means.

Another object of my invention is to provide an improved method for maintaining an equilibrium operating temperature of a flow control device immediately downstream of a centrifuging fiberizing means.

Still another object is to provide an optimum flow controller configuration having laminar or turbulent flow.

These and other objects and advantages of my invention will appear more fully hereinafter, and for purposes of illustration, but not of limitation, embodiments of my invention are shown in the accompanying drawings which:

FIG. 1 presents a diagrammatic cross sectional view of the low pressure zone downstream of the rotor without my invention.

FIG. 3 illustrates an embodiment of my invention employing a rearward facing step at the point of flow transition from rotor to flow controller inducing turbulent flow along the flow controller profile.

FIG. 4 shows an alternative design for the embodiment of FIG. 3.

PREFERRED EMBODIMENTS OF MY INVENTION

Figure 1:
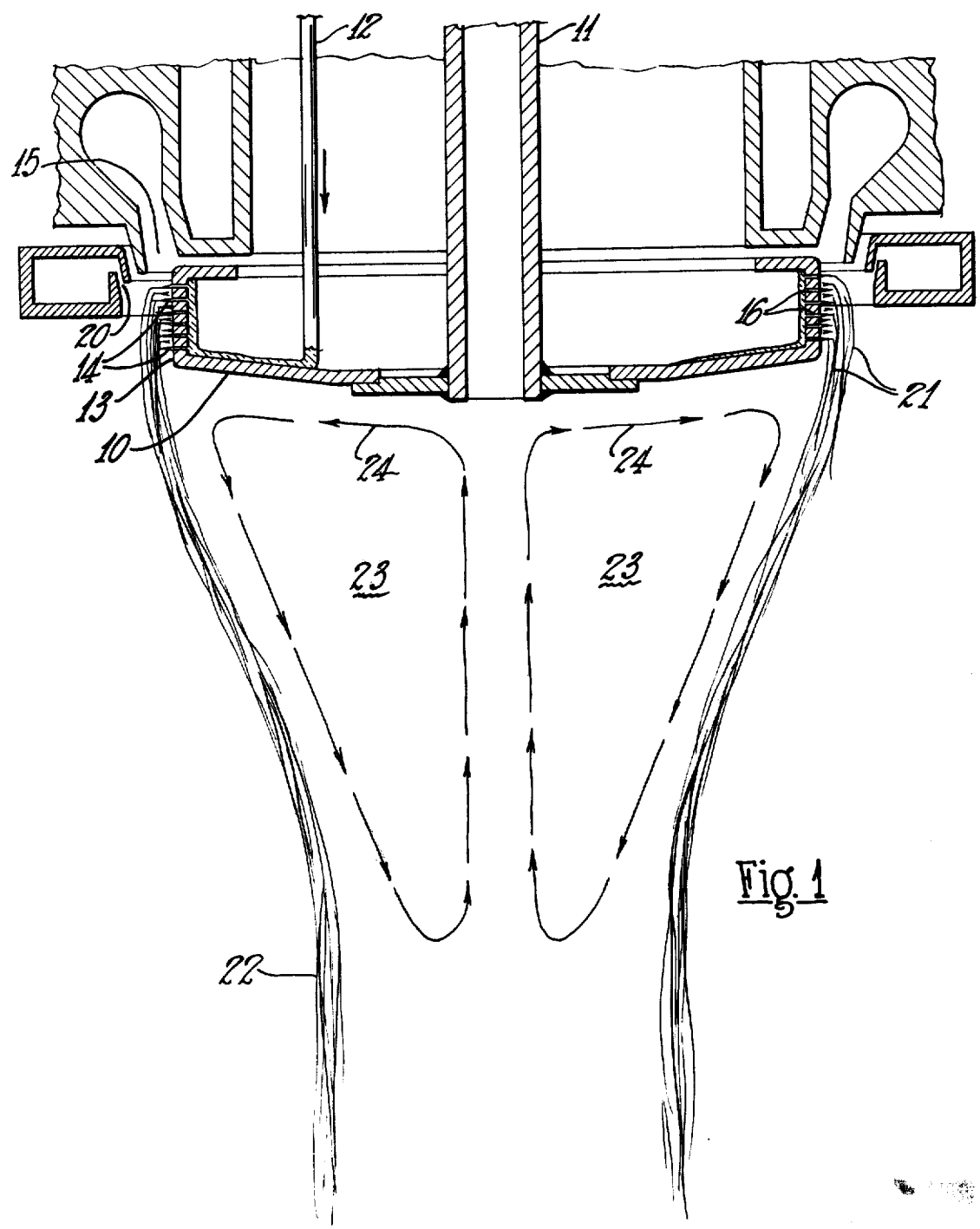

Referring now to the drawings:

FIG. 1 shows a centrifuging rotor 10 rotated by a driving spindle or quill 11. The rotor 10 receives a stream of molten material 12 such as glass which by the centrifugal forces imparted thereto is caused to flow out and up the inside of the rotor face 13. Because of the hydrostatic pressure acting upon the molten glass it is forced to flow through a multiplicity of holes 16 drilled in the rotor face 13. The resulting streams of molten glass 14 are acted upon by a blast of high temperature combustion gases exhausting through burner port 15 and directed downward upon the molten glass streams. In addition a jet of high pressure gas or steam is ejected through blower nozzle 20. The combination of high temperature high pressure gases from the burner 15 and high pressure gas ejected from the blower 20 act upon the molten glass streams 14 and attenuate those streams into fibers 21 and direct and accelerate said fibers into a rearward flowing cylindrically shaped veil 22 of high velocity gas with entrained lengths of fibers.

By the above described action a zone of entrapped gases 23 having a pressure below ambient exists immediately downstream of the rotor 10. Within this zone 23 a reverse flow exists depicted by the arrows 24. This low pressure zone 23 and the flow therein 24 is generally unstable and variable causing a similarly unsteady veil of fibers 22. The veil 22 is caused to wobble randomly and results in an unsatisfactory non uniform product below.

Figure 2:
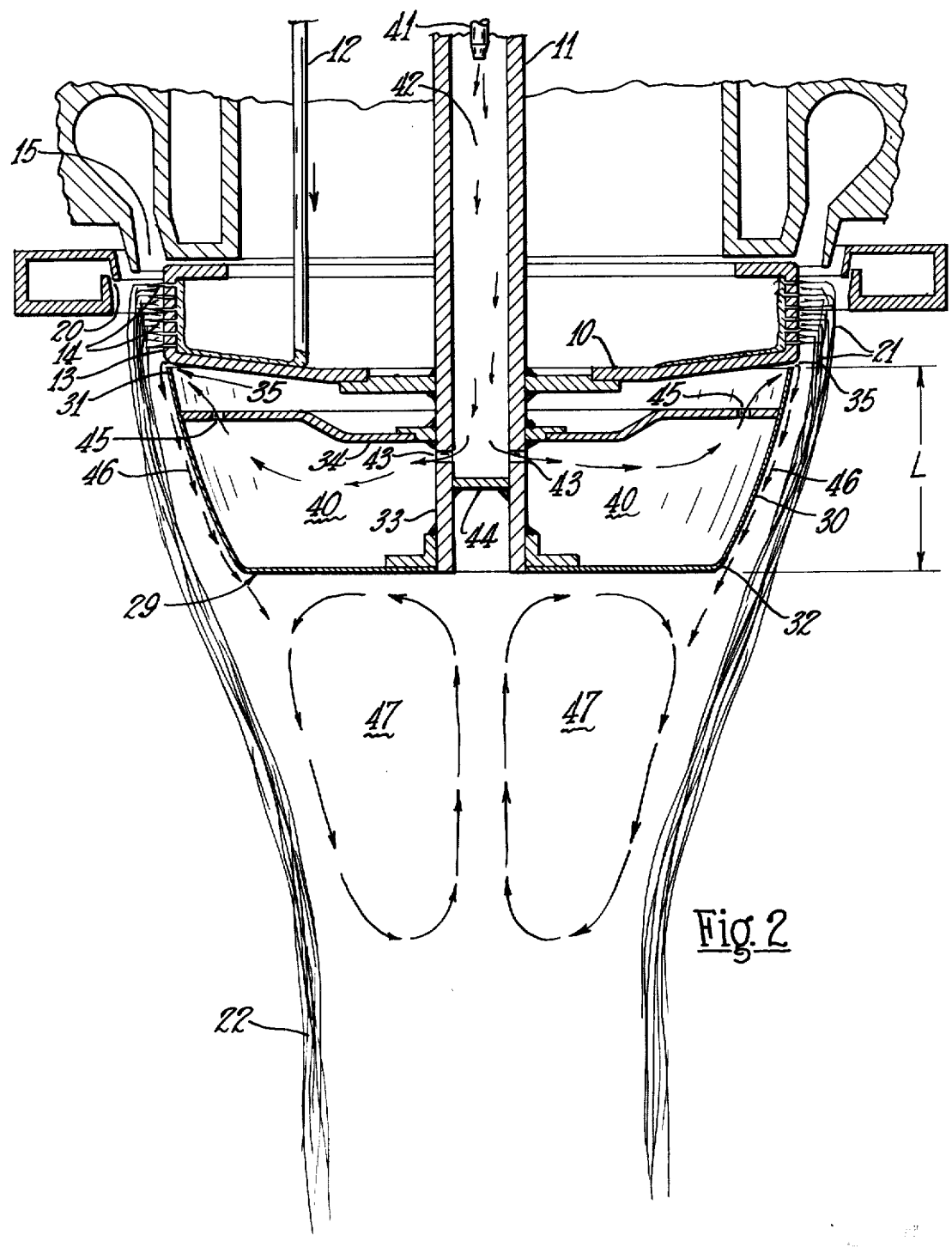
FIG. 2 shows one embodiment of my invention whereby the transition from rotor face to flow controller provides for laminar flow over the flow controller.

FIG. 2 shows an embodiment of my invention wherein the apparatus and process of forming glass fibers 21 by supplying a stream of molten glass 12 to a high speed rotor 10 as described above is improved upon as follows: The quill 11 is extended below the rotor 10 to which a flow controller 29 is attached by suitable means such as the disc shaped support means 34. The flow controller 29 geometrically comprises a truncated body of revolution. The body of revolution may be of the conic form but more preferably it approximates the nominal streamline defining the low pressure region downstream of the rotor 10 if the flow controller 29 were not present. Such a body of revolution, by way of example, will be of the parabolic, hyperbolic or ellipsoidal geometry, etc. The flow controller body begins at 31 immediately below the rotor face 13 leaving an annular open space or slot 35 between the flow controller body and the rotor 10; continues downstream and inward toward the rotor axis in accord with the desired profile to the level of truncation 32 and continues horizontally to the quill extension 33 and is suitably attached thereto. A plenum chamber 40 is thereby formed by the disc shaped support 34, the quill extension 33 and the flow controller profile 30.

A relatively cool gas such as air 41 is injected into the center passage 42 of quill 11 flowing into the plenum 40 through suitable openings 43. Restriction 44 blocks the center passage 42 below the openings 43 forcing the cooling gas into the plenum 40. From the plenum 40 the cooling gas flows through suitable openings 45 in the support disc 34 passes along the bottom of the rotor 10 exiting through the annular slot 35 providing mass addition to the boundary layer flowing downstream along the flow controller profile, as indicated by the arrows 46. The cool boundary layer flowing along the flow controller profile 30 reduces the aerothermodynamic convective heat transfer from the high temperature veil 22 to the flow controller profile 30. It is preferred to maintain the flow controller at a temperature below 700° F so that fibers striking the controller will not adhere thereto. Further the boundary layer being more dense by virtue of the relatively cool gas injected therein is believed to reduce the tendency of the fibers to penetrate the boundary layer and strike the profile 30. I have found that thirty cubic feet per minute of standard shop compressed air supplied at forty to fifty pounds per square inch is adequate for a twelve to fifteen inch diameter rotor producing approximately 1,000 to 1,500 pounds of glass fibers per hour.

The flow controller 29 occupies that portion of the low pressure region, reference 23 in FIG. 1, immediately downstream of the rotor 10 having the greatest affect on the fiber veil flow parameters and provides an optimum flow profile 30 for the high velocity veil 22 to follow. By the presence of the flow controller 29 in this region the veil instability generator is replaced by a solid geometric shape that controls and imparts stability to the veil 22. The length L of the flow controller necessarily depends upon the geometry of the rotor and flow properties of the veil. For a glass fiberizer having a rotor diameter between 12 and 15 inches and producing in the neighborhood of 1,000 to 1,500 pounds of glass fibers per hour I have found that a suitable ratio of length L to rotor diameter is approximately 0.70. For rotors having a diameter of approximately eight inches this ratio may exceed 1.0.

Below my flow controller a smaller less intense low pressure zone 47 remains. However, because of the presence of the flow controller 29 the volume is much smaller than the zone 23 in FIG. 1 and has much less affect on the veil stability. Further, because of the presence of my flow controller 29 the veil 22 has been stabilized by flowing along the profile 30 prior to being influenced by the remaining low pressure zone 47. The kinetic energy imparted to the veil 22 along the controlled flow path determined by the profile 30 stabilizes the veil prior to being influenced by the less intense low pressure zone 47.

FIG. 3 shows a further embodiment of my invention wherein the flow controller profile 50 does not follow the separating streamline between the fiber veil 22 and the low pressure zone 23 of FIG. 1 but inward parallel to that separating streamline. As a result thereof the flow controller profile 50 in combination with the geometry of the rotor 10 creates a downstream facing step 51 with respect to the flow of attenuating fibers 21 flowing downstream from the rotor. The presence of the downstream facing step 51 induces turbulent flow 52 along the profile 50.

A gaseous cooling medium such as air or stream is passed through the quill 11, and into the plenum chamber 40 as in the embodiment shown and described in FIG. 2. Said cooling gas is similarly introduced as a mass addition medium to the turbulent flow 52 through the annular slot 53 defined by the base of the rotor 10 and the flow controller profile 50. The cooled turbulent flow 52 along the flow controller profile 50 has an increased cooling effect on the flow controller body. However, the probability of fibers striking the flow controller profile 50 is greater than that of my laminar flow shown in FIG. 2.

FIG. 4 shows still another embodiment of my turbulent flow controller which also employs the rearward facing step to induce turbulent flow along the flow controller profile 50. However, in the embodiment a lip or shield 55 is provided to protect the bottom of rotor 10 from occasional fiber strikes that may result because of the small reverse flow field 56, characteristically present downward of a rearward facing step.

The cooling gas flow is shown by the arrows 57 and is injected into the boundary layer through the annular slot 58 formed between the rotor 10 and lip 55.

I claim:

1. In apparatus for producing glass fibers by supplying molten glass to a centrifuging means having a plurality of openings about its periphery such that the molten glass emanates from said openings in molten streams and is subjected to a high temperature high velocity gaseous attenuating means discharged about the periphery of said centrifuge means and directed into engagement with said emanating molten streams of glass such that a veil of glass fibers is caused to flow axially away from said centrifuge means, the improvement comprising a converging body of revolution positioned within said veil of fibers and immediately downstream of said centrifuging means, means for supplying a continuous flow of gas as mass addition to the boundary layer of said body of revolution.

2. The improvement claimed in claim 1 wherein said body of revolution is truncated.

3. In apparatus for producing glass fibers by supplying molten glass to a centrifuging means having a plurality of openings about its periphery such that the molten glass emanates from said openings in molten streams and is subjected to a high temperature, high velocity gaseous attenuating means discharged about the periphery of said centrifuge means and directed into engagement with said emanating molten streams of glass such that a veil of glass fibers is caused to flow axially away from said centrifuge means, the improvement comprising a truncated body of revolution positioned downstream from said centrifuging means having a geometric profile approximating the separating streamline that would otherwise define the region of low pressure immediately downstream of said centrifuge means in the absence of said body of revolution, said body of revolution having an upstream diameter equal to that of the centrifuge means and defining an annular slot therebetween, means for delivering a flow of gas to said annular slot and dispersing it therefrom as mass addition to the boundary layer of the body profile.

4. In apparatus for producing glass fibers by supplying molten glass to a centrifuging means having a plurality of openings about its periphery such that the molten glass emanates from said openings in molten streams and is subjected to a high temperature high velocity gaseous attenuating means discharged about the periphery of said centrifuge means and directed into engagement with said emanating molten streams of glass such that a veil of glass fibers is caused to flow axially away from said centrifuge means, the improvement comprising a truncated body of revolution positioned downstream of said centrifuging means having a geometric profile approximately and paralleling the separating streamline that otherwise defines the low pressure region immediately downstream of said centrifuging means absent said body of revolution, said body of revolution having an upstream diameter less than said centrifuge means thereby providing in geometric combination therewith a rearward facing step to the attenuating gases flowing axially downstream from said centrifuging means, said body of revolution further forming in combination with said centrifuge means and annular slot at the base of said rearward facing step, means for delivering a flow of gas to said annular slot and dispersing it therefrom as mass addition to the boundary layer of said body of revolution.

5. In apparatus for producing glass fibers by supplying molten glass to a centrifuging means having a plurality of openings about its periphery such that the molten glass emanates from said openings in molten streams and is subjected to a high temperature high velocity gaseous attenuating means discharged about the periphery of said centrifuge means and directed into engagement with said emanating molten streams of glass such that a veil of glass fibers is caused to flow axially away from said centrifuge means, the improvement comprising a truncated body of revolution positioned downstream of said centrifuging means having a geometric profile approximating and paralleling the separating streamline that otherwise defines the low pressure region immediately downstream of said centrifuging means absent said body of revolution, said body of revolution having an upstream peripheral diameter less than that of the centrifuge, a radial flange extending from said upstream periphery running parallel along the bottom of said centrifuge terminating at a radius between said body of revolution's upstream periphery and the centrifuge radius, said flange forming in combination with the centrifuge bottom an annular duct through which a gaseous mass addition is injected into the boundary layer of said body of revolution.

6. The apparatus claimed in claim 5 wherein said radial flange terminates at a radius equal to that of the centrifuge.

7. The apparatus of claim 1 wherein said body of revolution is a cone.

8. The apparatus of claim 2 wherein said truncated body of revolution is a truncated cone.

9. In the process of forming fibers by centrifuging molten glass into streams, engaging sid streams by a high molten glass into streams, engaging said streams by a high velocity high temperature annular gaseous blast positioned about the centrifuge periphery thereby attenuating the streams into fine fibers and conveying said fibers axially away from the centrifuge as a cylindrical veil flowing over a coaxial body of revolution immediately downstream of said centrifuge, the method of reducing heat transfer from the high temperature gases within said veil to said body by injecting a continuous flow of gas as mass addition to the boundary layer existing over the surface of said body of revolution.

10. In the process of forming fibers by centrifuging molten glass into streams, engaging said streams by a high velocity high temperature annular gaseous blast positioned about the centrifuge periphery thereby attenuating the streams into fine fibers and conveying said fibers axially away from the centrifuge as a cylindrical veil flowing over a body of revolution having an enclosed volumetric capacity, said body being coaxial with and immediately downstream of the centrifuge, the method of cooling said body of revolution by:
 a. supplying a flow of gas to the internal volume of said body of revolution thereby convectively removing heat from within said body,
 b. exhausting said gas into the boundary layer existing over the external surface of said body as mass addition thereto, thereby reducing the aerothermodynamic convective heat transfer across said boundary layer and to the body of revolution.

11. In the process of forming fibers by centrifuging molten glass into streams, engaging said streams by a high velocity, high temperature gaseous blast positioned about the centrifuge periphery thereby attenuating the streams into fine fibers and conveying said fibers axially away from the centrifuge as a cylindrical veil flowing over a coaxial body of revolution ,mmediately downstream of the centrifuge, the method of reducing heat transfer from the high temperature gases within said veil to said body comprising:
 a. inducing a turbulent boundary layer flow over the external surface of said body of revolution,
 b. injecting an continuous flow of gas as mass addition to said turbulent boundary layer thereby reducing the aerothermodynamic convective heat transfer across the boundary layer and to the body of revolution.

12. In the process of forming fibers by centrifuging molten glass into streams, engaging said streams by a high velocity high temperature gaseous blast positioned about the centrifuge periphery thereby attenuating the streams into fine fibers and conveying said fibers axially away from the centrifuge as a cylindrical veil flowing over a coaxial body of revolution positioned immediately downstream of the centrifuge and forming a circumferential downstream step with the periphery of said centrifuge, the method of reducing heat transfer from the high temperature gases within said veil to said body of revolution comprising injecting a continuous flow of gas at the base of said downstream step as mass addition to the boundary layer existing over the surface of said body of revolution.

* * * * *